United States Patent
Magnusson et al.

(10) Patent No.: US 6,285,874 B1
(45) Date of Patent: Sep. 4, 2001

(54) CELL IDENTIFICATION BASED ON DISTANCE

(75) Inventors: Sverker Magnusson; Håkan Olofsson, both of Stockholm; Katarina Isaksson, Stocksund; Stephan Trzeciak, Stockholm, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/196,167

(22) Filed: Nov. 20, 1998

(30) Foreign Application Priority Data

Nov. 21, 1997 (SE) .................................................... 9704281

(51) Int. Cl.$^7$ ...................................................... H04Q 7/20
(52) U.S. Cl. ..................... 455/422; 455/436; 455/423; 455/426; 455/517; 455/446
(58) Field of Search ...................... 455/422, 423, 455/517, 426, 436, 458, 445, 424, 67.1, 450, 452, 446, 524

(56) References Cited

U.S. PATENT DOCUMENTS

| | | | |
|---|---|---|---|
| 5,640,677 | * | 6/1997 | Karlsson ............................. 455/33.2 |
| 5,673,307 | * | 9/1997 | Holland et al. ........................ 379/60 |
| 5,905,950 | * | 5/1999 | Anell .................................. 455/421 |
| 5,999,522 | * | 12/1999 | Rohani ................................. 370/331 |
| 6,125,280 | * | 9/2000 | Grandhi et al. ....................... 455/446 |

FOREIGN PATENT DOCUMENTS

| | | |
|---|---|---|
| 0709983A1 | 5/1996 | (EP) . |
| 0720402A2 | 7/1996 | (EP) . |
| 9706648A1 | 2/1997 | (WO) . |
| 9732445A1 | 9/1997 | (WO) . |

\* cited by examiner

Primary Examiner—Thanh Cong Le
Assistant Examiner—Lana Le
(74) Attorney, Agent, or Firm—Burns, Doane, Swecker & Mathis, L.L.P.

(57) ABSTRACT

The present invention relates generally to the problem of determining the identity of a cell for e.g. cell handoff or automatic frequency planning, and more particularly to the problem of determining the true identity of a cell when only the transmission frequency and a non-unique identity code is known. A candidate list is created for each cell. This candidate list is created based on a function of various elements e.g. distance, transmission power, cell type, and antenna placement. The cells are then ranked on the candidate list based on this function. When a particular frequency/code combination is detected, the candidate list is then consulted, and the highest ranking cell with the same frequency/code combination is chosen as being the signal source. In an alternative embodiment the neighbor cell list is used to create the candidate list. If there are no matches on this list for the detected frequency/code combination, then the neighbors of the cells on the candidate list are also added to the candidate list which is then checked for a match.

32 Claims, 7 Drawing Sheets

Candidate List for Cell A 500

| Cell ID | Freq | ID Code | Dist.From A | Cell-Type |
|---|---|---|---|---|
| 4637282 | 5 | 37 | 48 | Macro |
| 2737495 | 11 | 64 | 53 | Micro |
| 3689234 | 5 | 37 | 62 | Macro |
| 3525890 | 6 | 34 | 76 | Micro |

Fig. 5A

Candidate List for Cell A 500

| Cell ID | Freq | ID Code | Dist.From A | Power |
|---|---|---|---|---|
| 4637282 | 5 | 37 | 48 | 43dBm |
| 2737495 | 11 | 64 | 53 | 21dBm |
| 3689234 | 5 | 37 | 62 | 33dBm |
| 3525890 | 6 | 34 | 76 | 28dBm |

Fig. 5B

Candidate List for Cell A 500

| Cell ID | Freq | ID Code | Dist.From A | Ant.Placement |
|---|---|---|---|---|
| 4637282 | 5 | 37 | 48 | Omni |
| 2737495 | 11 | 64 | 53 | 90 deg. |
| 3689234 | 5 | 37 | 62 | Omni |
| 3525890 | 6 | 34 | 76 | 90 deg. |

Fig. 5C

Candidate List for Cell A

| Cell ID | Freq | ID Code | Dist.From A | Cell-Type | Power | Ant.Placement |
|---------|------|---------|-------------|-----------|-------|---------------|
| 4637282 | 5    | 37      | 48          | Macro     | 43dBm | Omni          |
| 2737495 | 11   | 64      | 53          | Micro     | 21dBm | 90 deg.       |
| 3689234 | 5    | 37      | 62          | Macro     | 33dBm | Omni          |
| 3525890 | 6    | 34      | 76          | Micro     | 28dBm | 90 deg.       | f = A·Distance+B·Power+C·Placement+D·Cell-Type

CELL IDENTIFICATION BASED ON DISTANCE

FIELD OF THE INVENTION

The present invention relates generally to the problem of determining the identity of a cell for e.g. cell handoff or automatic frequency planning, and more particularly to the problem of determining the true identity of a cell when only the transmission frequency and a non-unique identity code is known.

RELATED ART

Figure 1:
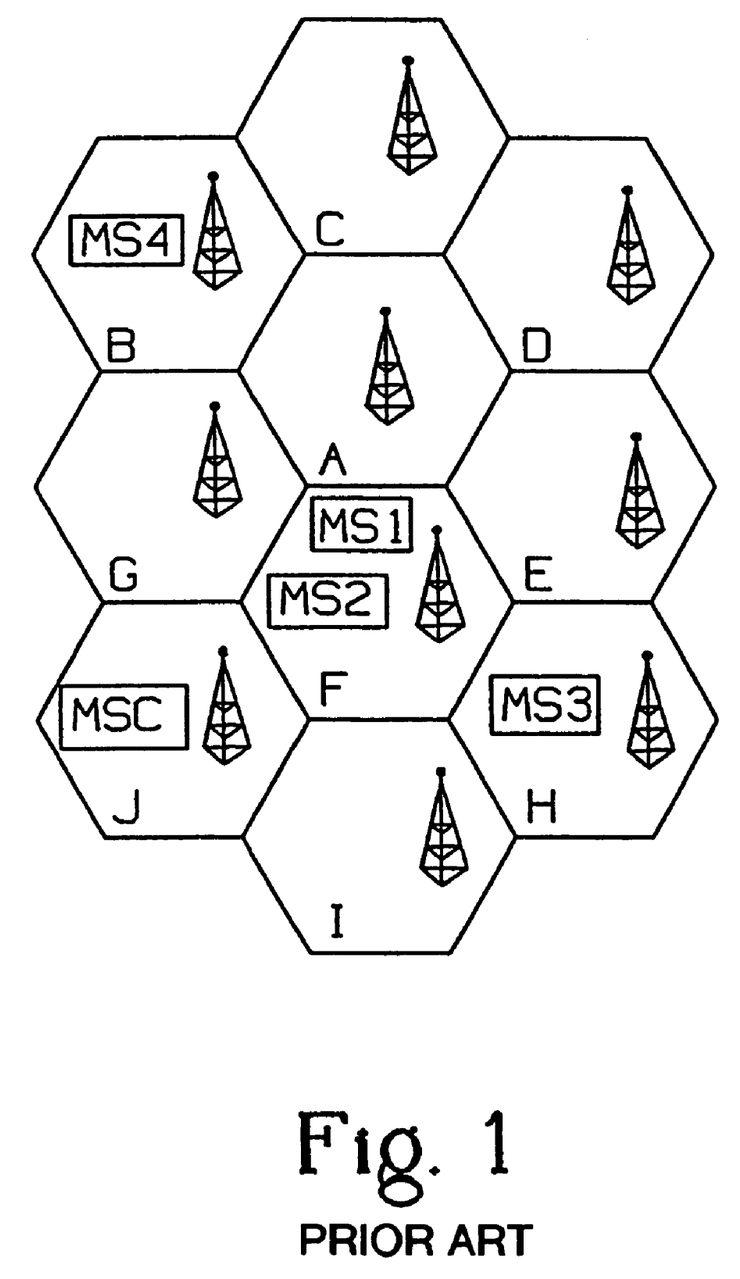
FIG. 1 is a drawing of a cellular mobile communications system.

In a cellular mobile communications system as shown in FIG. 1, a user of a mobile station, e.g. MS1–MS4, communicates with the system through a radio interface while moving around the geographic area covered by the system. The radio interface between the mobile station and system is implemented by providing base stations, e.g. BS1–BS10, spread throughout the geographical area of the system. Each base station is capable of radio communication with the mobile stations operating within the system.

In a typical mobile system each base station of the system controls communications within a certain geographic coverage area ideally represented by a hexagonal shape called a cell. A mobile station, e.g. MS1, which is located within this cell communicates with the base station controlling that cell, e.g. BS1. When a call is initiated by the user of this mobile station MS1, or received at the system and destined for this mobile station MS1, the call is set up on radio channels assigned to the base station BS1 controlling the cell A in which the mobile station MS1 is located. There are only 10 cells A–J shown in FIG. 1. Obviously mobile systems are not limited to such a small size and 10 cells are shown merely for illustration. Similarly only 4 mobile stations MS1–MS4 are shown while there can be numerous mobile stations operating within each cell. In addition to the base stations there is also a Mobile Switching Center MSC that controls communications between the system, which is itself in contact with other systems, and the base stations. The MSC is normally connected by several lines, not shown here, to each base station.

If a mobile station moves away from the original cell in which the call was set up, and the signal strength on the radio channels of the original cell weakens, the system will affect a transfer of the call to radio channels of a base station controlling a neighbor cell into which the mobile station moves. For example, cell A will normally have as its neighbors cells BG. As the mobile station moves through the system, control of the call may be transferred from the neighboring cell to another cell. This transfer of the call from cell to cell is termed handoff.

Handoff can only be effective if the call is transferred to radio channels that provide adequate signal strength for two-way communications. This requires sufficient signal strength at both the receiver of the mobile station and receiver of the base station to which the handoff is made. The signals must also be sufficiently strong in relation to any noise or interference in the network.

To perform a handoff it is necessary that some sort of signal strength or interference level measurement process be used to determine which of the neighboring cells is to be selected for handoff. Various measurement processes are known in the art and are not the subject of the present invention. In current systems this is done by either making measurements at the receivers of neighboring base stations on signals transmitted from the mobile station, by making measurements at the receiver of the mobile station on signals transmitted from neighboring base stations, or by making measurements at both mobile stations and base stations.

For example, in the analog cellular system based on the EIA/TIA—533 Mobile Station—Land Station Compatibility Specification (AMPS), handoff measurements are done solely at neighboring base stations. When a measurement at the base station, e.g. BS6, covering the cell, e.g. cell F, in which the mobile, e.g. MS2, is currently operating indicates that the signal strength from that mobile has dropped below a certain level, the base station BS6 informs the mobile switching center MSC in control of the system. The MSC then initiates the handoff measurement process by ordering neighboring base stations, e.g. BS1 BS5 BS7–10, to monitor the signal transmitted by the mobile station MS2 on the current radio channel assigned to the call, and measure the strength of the signal. After receiving measurement results, the MSC will then initiate the handoff of the call from the current cell F to the cell, A, E, H, I, J, or G, containing the base station reporting the highest received signal strength.

The MSC uses a "neighbor cell list" that is associated with the current cell to determine which base stations receive the measurement order from the MSC. This neighbor cell list is created and set manually by the system operator and remains fixed until the operator later manually modifies the list. Because this type of handoff measurement process consumes a large amount of signalling capacity, the number of cells on the neighbor cell list is limited. The neighbor cell list usually contains the cells bordering the current cell. If hexagonal cell shapes, as in FIG. 1, are used, this yields six bordering cells.

As contrasted with analog systems, digital systems usually allow the handoff measurement process to be performed at the mobile station. An example of this is the IS-54 standard using time division multiple access (TDMA) signal transmission. In TDMA, communications between a base station and a particular mobile station are transmitted on radio channels that may also be used for communications between the same base station and several other mobile stations.

Voice transmissions are digitized and transmitted as bursts in timeslots that are time multiplexed on the radio channels. Each mobile station in communication with a base station is assigned a timeslot on both the reverse channel and forward channels. The assigned timeslots are unique for each mobile station so communications between different mobiles do not interfere with each other.

In IS-54B the handoff method is called Mobile Assisted HandOff (MAHO). Handoff measurement is done at the mobile station when the mobile is neither transmitting on the reverse channel timeslot nor receiving on the forward channel timeslot. During these times between bursts the mobile station periodically monitors radio channels of each base station located in close proximity. The control channel of each neighboring base station is typically used as the measurement channel.

For each call the measurement channels are contained in the neighbor cell list of the cell in which the call is proceeding. In addition to measuring over these measurement channels, the mobile also measures the received signal strength on the current channel on which the call is proceeding. The mobile transmits these measurement results to the current base station which then forwards them to the MSC. If the received signal strength on the current channel falls below the strength on a measurement channel of a neighboring cell, the MSC initiates handoff to that neighboring cell.

Since a MAHO is performed primarily within the mobile station, resources for performing it are limited. Because only a limited number of measurements can be performed each second, it is necessary to average measurements to provide a reliable signal strength value. Thus, it is necessary to limit the number of cells that comprise the neighbor cell list for MAHO purposes. IS-54B standards are limited to 12 cells, while IS136 sets a size limit of 24 cells.

When the system operator creates a neighbor cell list for a cell, he wishes to ensure that calls in the cell can be handed over to a second cell, no matter what type of movements take place. A difficulty with this is that the actual coverage area of a cell is difficult to predict. The size and shape of a cell's coverage area may vary due to different effects such as base stations being located in different positions or shadowing effects on radio coverage caused by obstacles, e.g. buildings.

The best cell for a handoff may not always be one of the six bordering cells from an ideal hexagonal configuration. It is possible that the best candidate might be a cell that lies beyond one of the six bordering cells. Since it is difficult to predict the actual coverage area of each individual cell in a system, it becomes very difficult to create a neighbor cell list for the handoff process in this situation. Without knowing the coverage area of each base station, it would be necessary to include all possible cells to create the most accurate list for handoff measurements. However, as shown above, there are limits to how many cells may be included on a neighbor cell list.

What is common about today's systems using neighbor cell lists is that they use a frequency/code combination to identify a cell. In AMPS and D-AMPS this code is an identity for the cell transmitted by each mobile station. In GSM the code used is a Base Station Identity Code (BSIC), which is used by the mobile station to identify each cell in a Mobile Assisted Handover (MAHO). It should be noted that in GSM the BSIC is not an unambiguous identification of a base station.

Figure 2:
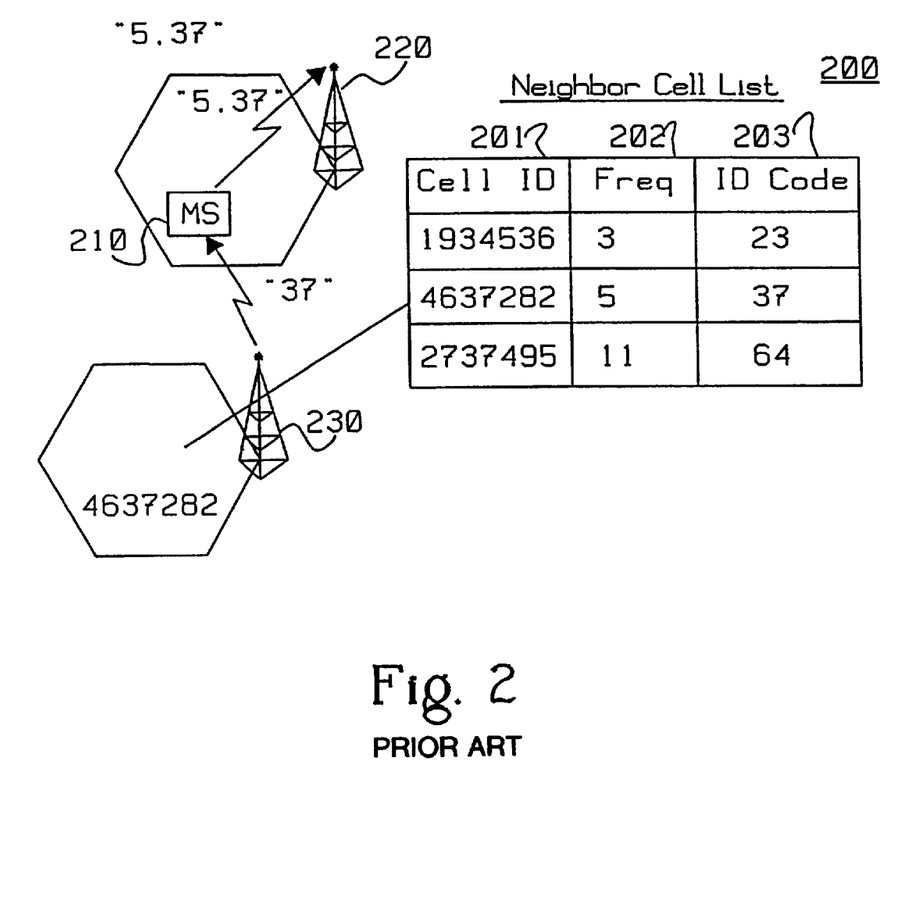
FIG. 2 is a diagram of current system using a neighbor cell list for mapping from a frequency/code combination to the cell identity.

The BSIC, a 6-bit code word frequency, was deemed necessary to help the mobile station distinguish between signals received. With 6 bits one has 64 possible codes, multiplied by e.g. 12 frequencies (12 frequencies is used merely as an example of a number of frequencies typically used as beacon frequencies) gives 768 different combinations, so that duplication can be quite common in even medium sized cellular systems. As a result of these duplications, a mapping is required to map each frequency/code combination to the true cell identity. A simplified example how this mapping is performed in GSM is shown in FIG. 2. The neighbor cell list consists of the true cell identity, the broadcast frequency, and the identity code for each of the neighbor cells. The mobile station listens to the frequencies included on the list. The mobile station also decodes the BSIC and reports it to the base station. In AMPS, D-AMPS, and PDC, the procedure is slightly different, but the result is the same. The network knows a frequency/code combination and needs a mapping to the true cell identity.

The network uses the neighbor cell list to do the mapping. In FIG. 2 the mobile station 210 receives the frequency/code combination 5/37 for the neighbor cell 230. It then transmits this combination to the base station 220 in which it is currently operating. The network then uses this information and consults the neighbor cell list to conclude that the signal came from the neighbor cell 230 with the true cell identity 4637282.

A problem arises, however, when a frequency/code combination is detected that is not in the neighbor cell list of the current cell in which the mobile station is operating. In that case the network cannot determine the origin of the signal. This usually won't be a problem in performing a handoff since it is most likely that the handoff will be performed to one of the neighbor cells. However, it can be a problem when the signal strength measurements are used for purposes other than handoff.

It can also be a problem because the best cell for a handover may not be one of the cells on the neighbor cell list. For example, in algorithms for allocating dynamic neighbor cell lists, the handoff measurements are used to discover new possible neighbor cells. However, only frequency/code combinations are discovered in this case and the neighbor cell lists cannot be used for mapping on the true cell identity in this case. Another example is automatic frequency planning where it is more important to be able to determine the origin of signals from distant cells which are not normally included on neighbor cell lists. Advanced frequency planning algorithms can be used if the origin of signals from cells not included in the neighbor cell list can be determined.

SUMMARY OF THE INVENTION

The object of the present invention is to meet the problem, discussed above, in mobile communications systems of identifying the true cell origin of various signals due to the fact that there are many cells which can have identical frequency/code combinations. This present invention approaches this problem by providing a method for automatically mapping the frequency/code combinations onto the true cell identities.

The base station identities in the system are stored, preferably in a database, together with cell identities, transmission frequencies and identity codes. The method of database storing is well known in the art. Using this database, a candidate list is created for each cell, sorting all other cells according to their distance from the cell. When a frequency/code combination is detected in a cell, the candidate list is consulted for a matching frequency/code combination. The first cell on the list with a matching combination is concluded to be the origin of the signal.

In an alternative embodiment of the candidate list, the candidate list is first taken to be the neighbor cell list. If no matching combination is found, then the candidate list is modified to add cells in the neighbor cell lists of cells previously included in the candidate list ("the neighbors' neighbors"). This is repeated until a match is found. If more than one match is found, then the method is considered to have failed to identify the origin of the signal.

The neighbor cell list as known in the art and the candidate list as introduced by the present invention have obvious structural differences, but they also have functional differences. The candidate list is not merely a substitute for the neighbor list The advantages of the current invention are that it provides a method of automatically determining the true identity of a cell when only the transmission frequency and a non-unique identity code is known. This type of identification is especially useful or even necessary when using handover measurements for other network functions such as automatic frequency planning. The current invention can be used to provide a mapping in a "cell relation matrix" as is used in automatic frequency planning. Because the present invention provides a measure of the quality of the signal between all "n" cells in a mobile system, it can be used to maintain an n*n "quality matrix", as disclosed in U.S. patent application Ser. No. 08/609,422 "Adaptive Neighbor Cell Lists", based on the mapping from handover quality measurements to the cell identity as provided in the present invention.

In addition, the present invention can be used in automatic frequency planning systems where quality is measured on signals transmitted in other cells. By using the identification method according to the present invention a cell relation matrix can be maintained which describes the interference relation between any cell and any other cell in the system. For automatically determining what cells are neighbors to a certain cell the present invention can be used for identifying the true origin of a signal. This information can then be used to maintain a matrix describing the neighbor relation between any two cells. The present invention is also immediately applicable to existing cellular standards, both analog and digital.

The invention which meets the stated objects is defined according to the appended independent claims 1 and 12 and their associated dependent claims.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

Figure 3:
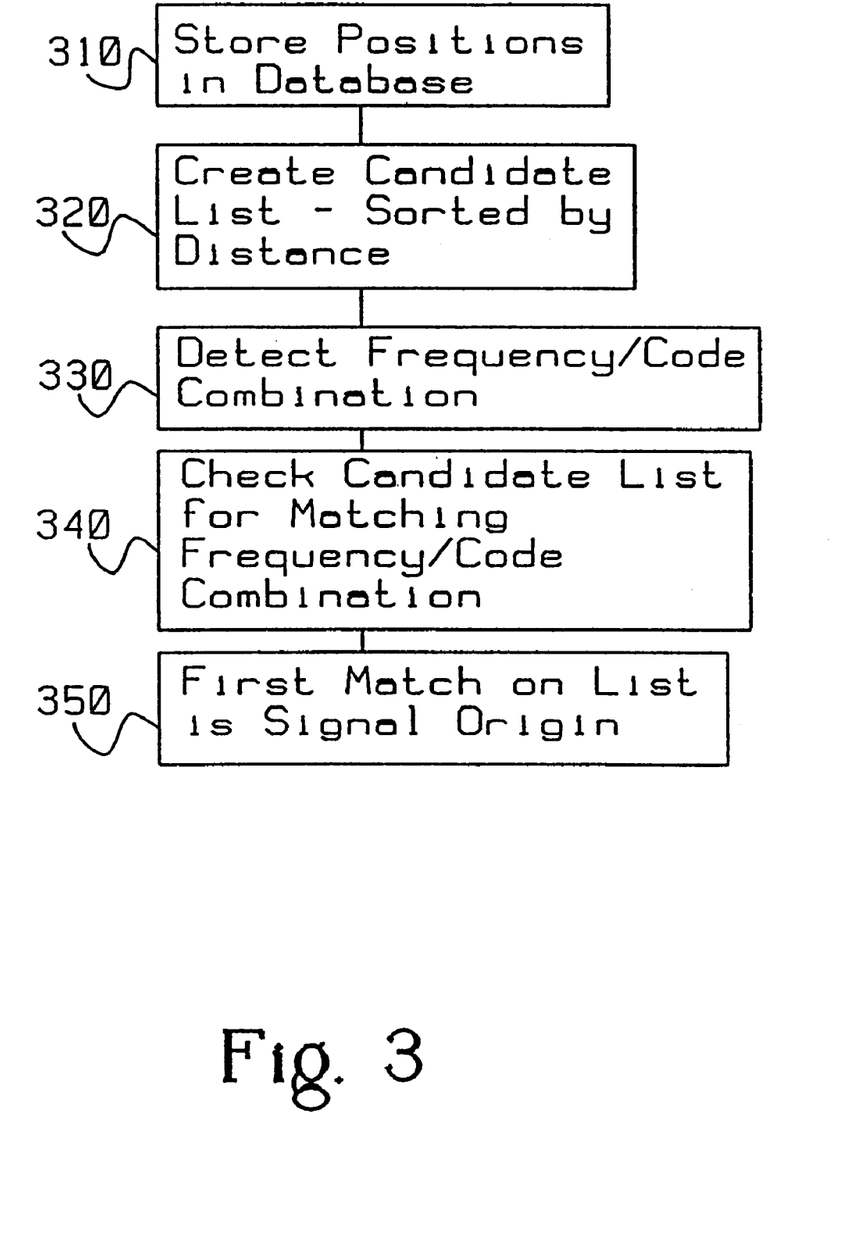
FIG. 3 is a flowchart illustrating the steps of the method in an embodiment of the present invention.

In FIG. 3 is shown a flowchart illustrating a method of determining the identity of a cell by mapping a frequency/code combination onto a cell identity according to the present invention. Although the description of the present invention illustrates the mapping of a frequency/code combination, it can be appreciated that the present invention is not limited to systems which measure frequency/code combinations. For example, a very narrowband system might have no codes, using only a detected frequency to map onto the cell identity. In a wideband system with only one frequency only a code will be detected and mapped onto the cell identity. The present invention is equally applicable to systems detecting and mapping only a code, only a frequency, or a combination of the two.

The first step of the method is to store the positions 310 of all the base stations in a system. These are geographical positions and can be stored as longitude and latitude or any of various geographical positioning means known in the art. These positions are stored in the database along with their transmission frequencies and identity codes.

The next step is to create a candidate list for each cell 320. This can be contrasted with a normal neighbor cell list. Current systems use limited cell lists, often the six neighbor cells for a hexagonal cell. These neighbor cell lists are usually used to produce a list of possible cells for handoff. In contrast, the current method according to the invention creates a list including all cells in the system.

The candidate list according to the present invention is not merely a replacement for neighbor cell lists. The candidate list is a means for determining the origin of signal strength on a specific frequency. In addition, the candidate list stores the distance from each other cell to the current cell. The candidates are then sorted according to their distance to the current cell.

In an alternative embodiment of the candidate list, only the closest matching cell is kept on the list, all other matches being deleted. In this way each frequency/code combination will occur only once on the list. The process of eliminating duplicate combinations means that sorting and ranking would need to be done as part of making the list, and the list would then not need to be sorted later. This alternate embodiment will be shorter and therefore save memory.

The next step occurs when a frequency/code combination is "detected" in a cell 330. This is the case when a handover is performed, for example, as discussed previously. The "detected" frequency/code combinations can also be used, for example to merely update the current list, instead of being used for real-time handoffs. When the combination is detected 330, the candidate list for that particular cell is checked 340 for a matching frequency/code combination. The first cell on the candidate list with a matching frequency/code combination is concluded to be the origin of the signal 350.

Figure 4:
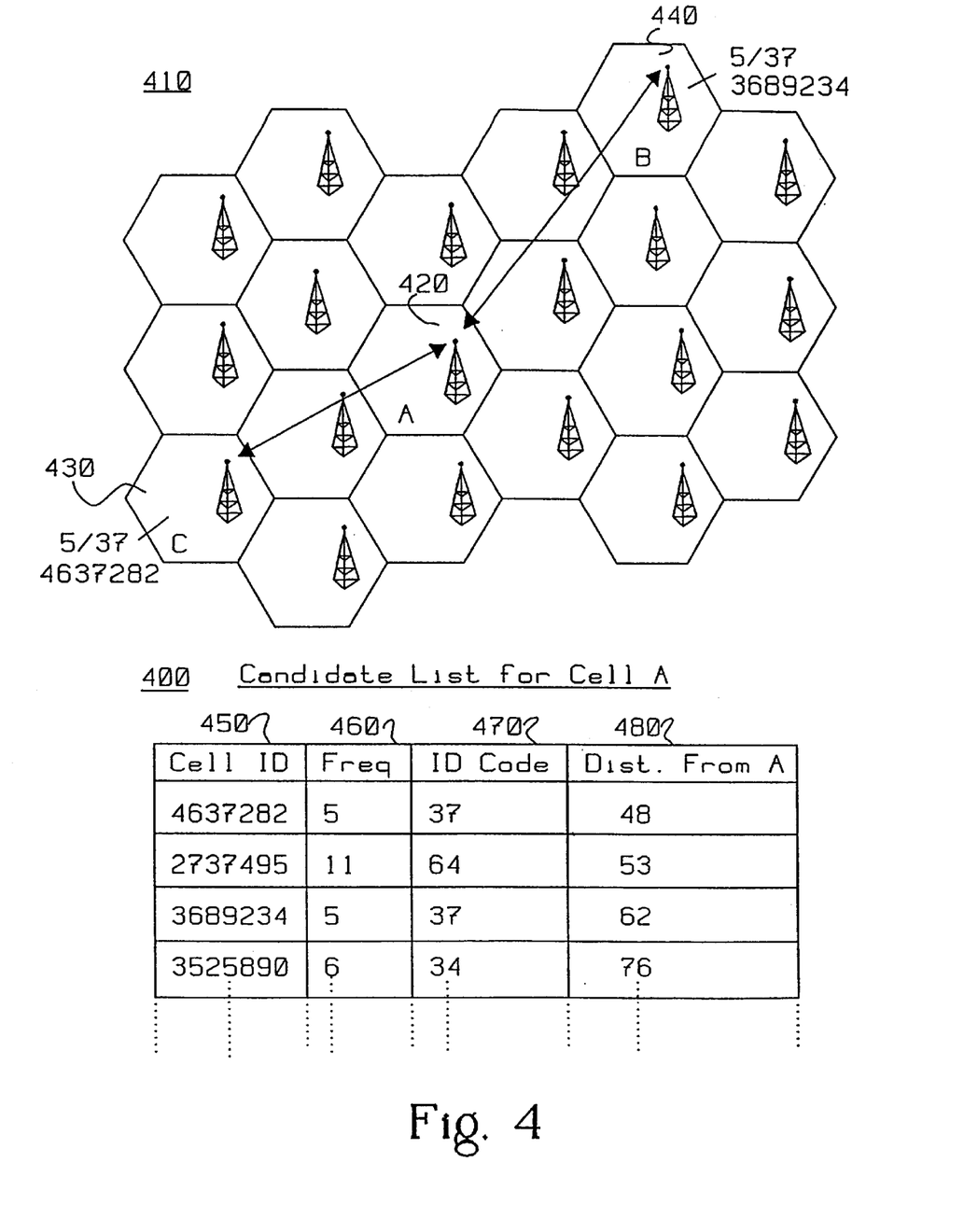
FIG. 4 illustrates the use of a candidate list according to the present invention.

FIG. 4 illustrates how the candidate list is designed and used according to the present invention. The candidate list is similar to a conventional neighbor cell list with Cell IDs 450, Broadcast frequencies 460 and ID Codes 470, but also includes the geographical distances 480 to the cell concerned, in this case cell A 420. Also shown is a cellular system 410. As can often happen, when a mobile station is scanning surrounding frequencies there exist identical frequency/code combinations which may individually be received from surrounding base stations.

In this case it is possible for a mobile station in cell A 420 to receive a frequency/cell combination of "5/37", from cell 430 with a Cell ID of 4637282 or an identical frequency/cell combination in cell 440 with a Cell ID of 3689234. However Cell 430 has a closer distance of 48 to cell A 420 than Cell 440 which has a distance of 62 to cell A 420. Therefore Cell 430 will be ranked higher on the Candidate List 400 for Cell A and will be chosen first.

There still exist certain disadvantages with the above described embodiment. This is due to the fact that in mobile systems it is often the case that a geographically closer cell is not necessarily received with a stronger power than a more distant cell. This can be due to various factors including e.g.: (1) different output powers in different cells, (2) different antenna placements (i.e. placement can involve both the height of the antenna and the antenna direction (e.g. an antenna pointed away is received more weakly)), and (3) other geographical factors that affect radio propagation.

Figure 5A:
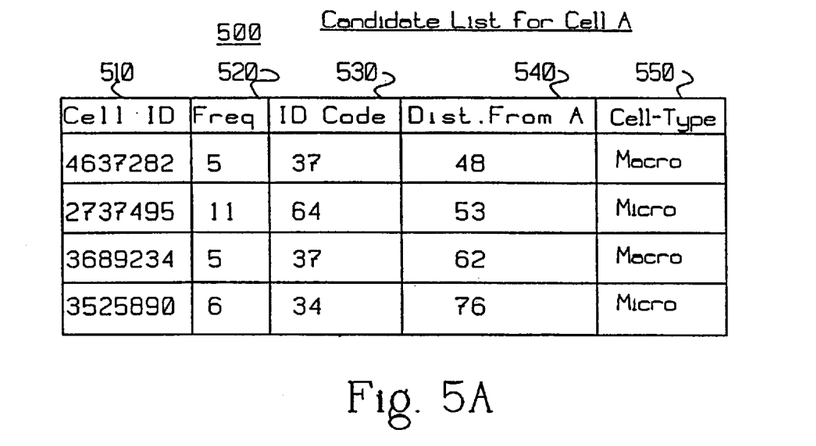
FIGS. 5A–5C illustrate modified versions of the candidate list according to the present invention.

As discussed above, one factor affecting the received power in a particular cell is the cell type of the transmitting cell (e.g. macrocell or microcell). Smaller cells, "microcells", have smaller base stations that usually have lower output power. Therefore it is desirable in an alternate embodiment to add an extra field in the candidate list to account for the output power for each cell. This is shown in FIG. 5A. Thus cells with lower cell power, and thus lower coverage area, will be ranked lower on the list than those with higher cell power.

Figure 5B:
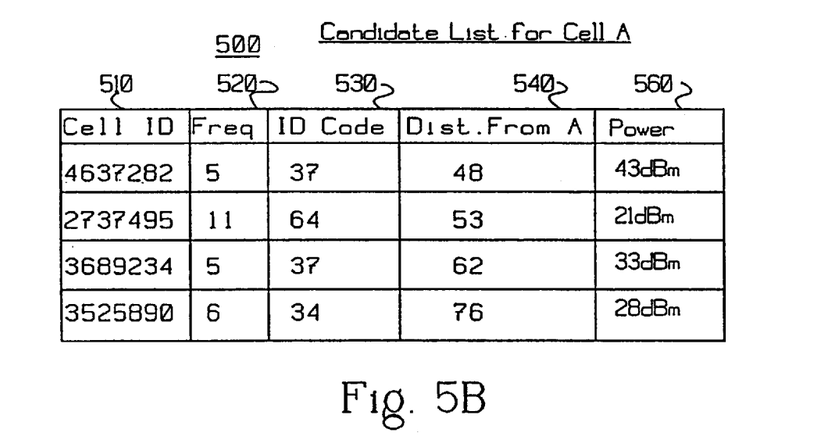
Figure 5C:
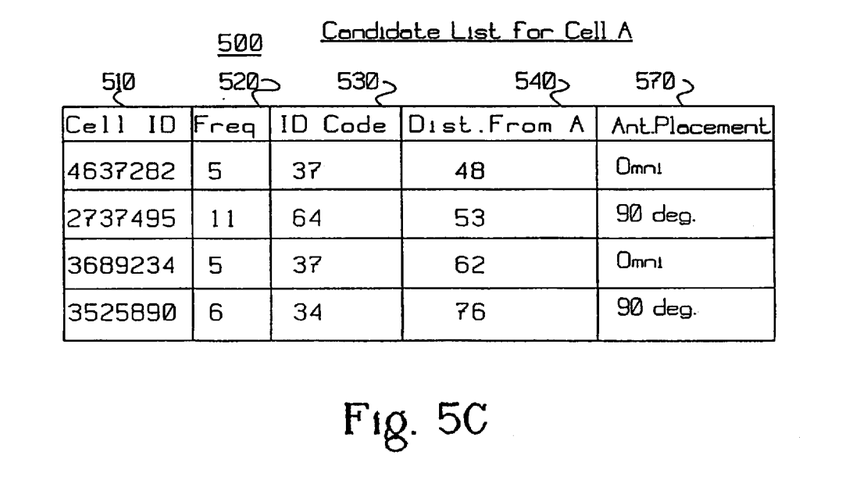

Another alternative is to take into account different types of cell definition. For example, a system can have cells designated as either "microcells" or "macrocells". It would then be preferable to rank "microcells" lower on the candidate list than "microcells" as shown in FIG. 5B. Another possibility is to consider antenna placement (e.g. antenna direction and antenna height) when ranking the various candidates on the candidate list as shown in 5C. It can be appreciated that other factors which affect the received signal strength, such as factors related to radio propagation, could also be included on a candidate list to be used for ranking of candidates. For example, to compensate for geographical factors affecting radio propagation, it is possible to obtain an estimate of how strongly the signal is affected by doing a coverage prediction with a coverage planning tool.

Figure 6:
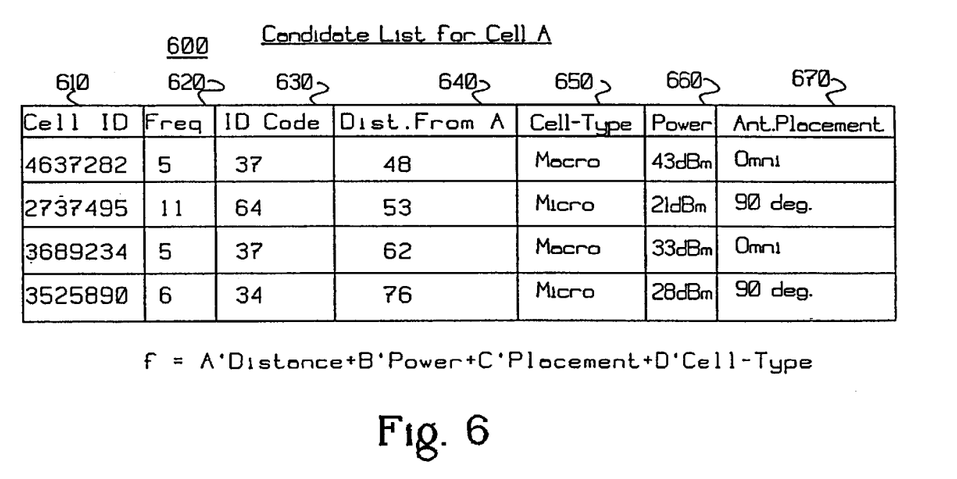
FIG. 6 illustrates a modified version of the candidate list according to the present invention.

When ranking is based merely on distance the process of ranking is quite simple. However it becomes more complicated when adding in other factors to be considered for ranking. For example, if signal power is added to the list it is possible to have cells with identical distances and different signal powers or perhaps identical signal powers and different distances. In these cases it becomes necessary to define a function f to be used for the ranking. This function can be, for example, $f=A*Distance+B*Power+C*Placement+D*Cell\text{-}type$ as shown in FIG. 6. The Candidate List in FIG. 6 is a combination of those shown in FIGS. 5A–5C. Thus, f can be function of e.g. distance between cells, transmission power, antenna placement, cell type(e.g. macrocell, microcell), and even factors relating to radio propagation (not shown in FIG. 6). Of course this example is for illustration only. In this example the constants A, B, C, or D, will be chosen by the system operator to provide different weight to the different variables Distance, Power, Placement and Cell-type.

Other functions f are possible, and can include other variables, not shown here, which can be used for ranking cells on a candidate list. The function f will provide a number which will be a ranking of each particular cell based on the variables(e.g. distance) being used and the various weightings assigned to these variables by the operators. The function f can be thought of as a "virtual distance" between cells. In an advanced case, executing the f function will be done by placing all the variables for f into a coverage planning tool which will result in a "virtual distance" based on the predicted attenuation between any cell and any other cell.

Figure 7:
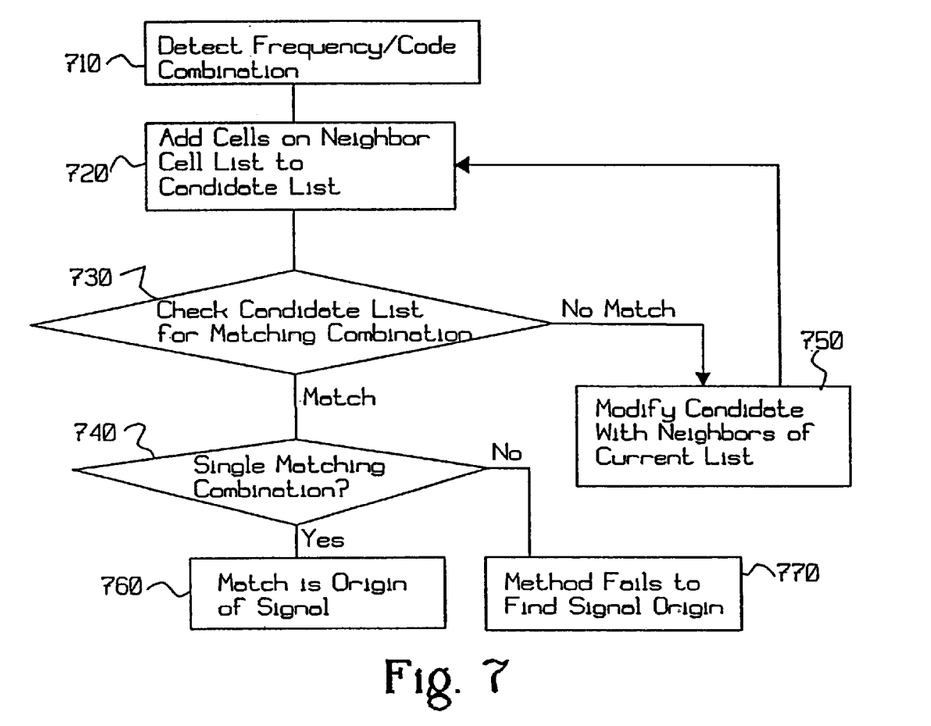
FIG. 7 is a flowchart illustrating another method using the candidate list.

Another embodiment of the present invention is shown in the flowchart in FIG. 7. This embodiment may be used alone or in combination with the previous embodiments discussed above. In comparison with the embodiments discussed above, this present embodiment also makes use of neighbor cell lists, and thus requires that these neighbor cell lists be well designed.

The first step of the present embodiment is performed when a particular frequency/code combination is detected at a base station 710. The system consults the neighbor cell list for this base station and adds the cells on this neighbor cell list to a candidate list 720. The next step is to check this candidate list, which now consists of those cells on the neighbor cell list, for a matching combination to the detected frequency/code combination 730.

If no match is found, the next step is to modify the candidate list 750. Each cell in the current candidate list is consulted one by one. Each neighbor cell list for each of these cells is then retrieved and the cells in these neighbor cell lists are added to the candidate list. In this way the "neighbors of the neighbors" are added to the candidate list.

After these "neighbors of the neighbors" are added to the list the system returns to the previous step 720 to again check this new modified candidate list for a matching combination to the detected frequency/code combination 730. If there is a match, this is checked to see if there is only one single matching combination 740. If only one matching combination is found, it is concluded that that cell was the origin of the signal 760. If more than one match is found, the method fails to identify the origin of the signal, unless some additional (e.g. geographic) information is also used 770. In this case you can resort to the previous embodiment shown in FIG. 3 and choose the closest of the matching cells.

The embodiments described above serve merely as illustration and not as limitation. It will be apparent to one of ordinary skill in the art that departures may be made from the embodiments described above without departing form the spirit and scope of the invention. The invention should not be regarded as being limited to the examples described, but should be regarded instead as being equal in scope to the following claims.

What is claimed is:

1. A method for determining the identity of a cell from which a signal is transmitted in a cellular mobile communications system having a plurality of cells, said cells having base stations for receiving and transmitting radio signals to and from at least one mobile station, said mobile station being situated in a first cell, said first cell having a candidate list and a non-unique identification of a second cell, said method comprising the steps of:

defining a virtual distance from said first cell to said second cell;

detecting, in said first cell, a non-unique identification transmitted from a cell other than said first cell;

checking said candidate list for said first cell for a matching, non-unique identification; and concluding that the cell identity on said candidate list, for which the non-unique identification matches the non-unique identification transmitted from said other cell, and for which said virtual distance is shortest, is the identity of the cell from which the signal was transmitted.

2. The method of claim 1 wherein said virtual distance is a function of the geographical distance between said first cell and said second cell.

3. The method of claim 1 wherein said virtual distance is a function of the transmitted power from said second cell and received in said first cell.

4. The method of claim 1 wherein said virtual distance is a function of the placement of the antenna for the base station in said second cell.

5. The method of claim 1 wherein said virtual distance is a function of the cell type of said second cell.

6. The method of claim 5 wherein said cell type is a macrocell.

7. The method of claim 5 wherein said cell type is a microcell.

8. The method of claim 5 wherein said cell type is a picocell.

9. The method of claim 1 wherein said virtual distance is a function of the factors relating to radio propagation of the signal from said second cell.

10. The method of claim 1 wherein said virtual distance is a function $f=A*Distance+B*Power+C*Placement+$ D*Cell-Type+E*Signal-Propagation, where A, B, C, D and E are constants determined by the operator of said system.

11. The method of claim 10 wherein said variables of said function f are placed in a coverage planning tool, resulting in a virtual distance based on the predicted attenuation between any cell in said system and any other cell in said system.

12. The method of claim 1 wherein said non-unique transmitted identification is a combination of the transmission signal frequency and a transmitted identification code.

13. The method of claim 1 wherein said non-unique transmitted identification is the transmission signal frequency.

14. The method of claim 1 wherein said non-unique transmitted identification is a transmitted code.

15. The method of claim 1 wherein said origin of said signal is used for planning the frequencies broadcast by the cells in said system.

16. The method of claim 1 wherein said origin of said signal is used for deciding which cell to handover to from said first cell.

17. The method of claim 1 wherein said origin of said signal is used for automatically producing a neighbor cell list for said first cell.

18. A method for determining the identity of a cell from which a signal is transmitted in a cellular mobile communications system having a plurality of cells, said cells having base stations for receiving and transmitting radio signals to and from at least one mobile station, said mobile station being situated in a first cell, said first cell having a neighbor cell list including a plurality of fields corresponding to neighbor cells of said first cell and fields for non-unique identification of a neighbor cells, said first cell also having a candidate list and a non-unique identification of said second cell, said method comprising the steps of:

a first step of detecting, in said first cell, a non-unique identification transmitted from a cell other than said first cell;

a second step of adding said plurality of fields for said cells in said neighbor cell list to said candidate list;

a third step of checking said candidtate list for a matching non-unique identification;

if there is no match then checking the neighbor cell lists for each cell on said candidate list and modifying said candidate list by repeating said second step and adding fields for each cell on each neighbor cell list for each cell on said candidate list and then repeating said third step and checking the modified candidate list for a matching non-unique identification.

19. The method of claim 18 wherein if there is only one match in said third step then conclude that the match is the origin of said signal.

20. The method of claim 18 wherein if there is more than one match in said third step then conclude that the method fails to find the origin of said signal.

21. The method of claim 20 wherein said neighbor cell list has a field for a virtual distance from said first cell to said neighbor cells, said candidate list has a field for a virtual distance from said first cell to said second cell, and further concluding that the cell identity on said candidate list for which the non-unique identification matches the non-unique identification transmitted.

22. The method of claim 21 wherein said virtual distance is a function of the geographical distance between said first cell and said second cell.

23. The method of claim 21 wherein said virtual distance is a function of the transmitted power from said second cell and received in said first cell.

24. The method of claim 21 wherein in that said virtual distance is a function of the placement of the antenna for the base station in said second cell.

25. The method of claim 21 wherein said virtual distance is a function of the cell type of said second cell.

26. The method of claim 25 wherein said cell type is a macrocell.

27. The method of claim 25 wherein said cell type is a microcell.

28. The method of claim 25 said cell type is a picocell.

29. The method of claim 21 wherein said virtual distance is a function of the factors relating to radio propagation of the signal from said second cell.

30. The method of claim 21 wherein said virtual distance is a function f=A*Distance+B*Power+C*Placement+D*CellType+E*Signal-Propagation, where A, B, C, D and E are constants determined by the operator of said system.

31. The method of claim 30 wherein said variables of said function f are placed in a coverage planning tool, resulting in a virtual distance based on the predicted attenuation between any cell in said system and any other cell in said system.

32. In a cellular communications system, a method for determining the identity of a cell from which a signal is transmitted comprising the steps of:

creating, in a first cell, a candidate list, wherein said candidate list includes a plurality of cells in said communication system;

sorting said plurality of cells in said candidate list by a distance from said first cell;

detecting, in said first cell, said signal, wherein said signal includes a non-unique identification;

checking said sorted candidate list for entries which match said transmitted non-unique identification; and determining the identity of said cell from which said signal is transmitted as the cell which corresponds to a first entry which matches said transmitted non-unique identification in said sorted candidate list.

* * * * *